United States Patent
Decrop et al.

(10) Patent No.: US 11,748,225 B2
(45) Date of Patent: Sep. 5, 2023

(54) DYNAMIC INTERFACE INTERVENTION TO IMPROVE SENSOR PERFORMANCE

(71) Applicant: International Business Machines Corporation, Armonk, NY (US)

(72) Inventors: Clement Decrop, Arlington, VA (US); Zachary A. Silverstein, Austin, TX (US); Spencer Thomas Reynolds, Austin, TX (US); Jacob Ryan Jepperson, St. Paul, MN (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 17/215,857

(22) Filed: Mar. 29, 2021

(65) Prior Publication Data
US 2022/0308973 A1      Sep. 29, 2022

(51) Int. Cl.
| G06F 11/32 | (2006.01) |
| G06F 11/34 | (2006.01) |
| G06F 3/04815 | (2022.01) |
| G06F 3/04842 | (2022.01) |

(52) U.S. Cl.
CPC .......... G06F 11/32 (2013.01); G06F 3/04815 (2013.01); G06F 3/04842 (2013.01); G06F 11/3409 (2013.01); G06F 11/3438 (2013.01)

(58) Field of Classification Search
CPC .. G06F 11/32; G06F 3/04815; G06F 3/04842; G06F 11/3409; G06F 11/3438
See application file for complete search history.

(56) References Cited

U.S. PATENT DOCUMENTS

| 8,555,613 | B2 | 10/2013 | Wang |
| 9,020,536 | B1 * | 4/2015 | Crossno ............. G06Q 10/0833 |
| | | | 455/67.11 |
| 9,325,861 | B1 * | 4/2016 | Ettinger ............. H04N 1/00183 |
| 10,073,541 | B1 | 9/2018 | Baldwin |
| 10,429,177 | B2 | 10/2019 | Purohit |
| 10,705,655 | B2 | 7/2020 | Goo |
| 10,721,375 | B1 * | 7/2020 | Boyd ....................... H04N 7/18 |
| 10,748,415 | B2 | 8/2020 | O'Connell |
| 10,748,521 | B1 * | 8/2020 | Mulvey ............ G10K 11/17833 |
| 10,775,614 | B1 * | 9/2020 | Gross ..................... H04N 23/67 |

(Continued)

FOREIGN PATENT DOCUMENTS

| CN | 101766014 A | 6/2010 |
| CN | 105122794 A | 12/2015 |

(Continued)

OTHER PUBLICATIONS

"Regarding The Old Hand-Over-The-Mic Test For Monitor Feedback," Sweetwater, accessed Mar. 25, 2021, 5 pages. <https://www.sweetwater.com/forums/showthread.php753625-Regarding-The-Old-Hand-Over-The-Mic-Test-For-Monitor-Feedback>.

(Continued)

*Primary Examiner* — Haimei Jiang
(74) *Attorney, Agent, or Firm* — Eric W. Chesley

(57) ABSTRACT

A computer-implemented method comprises obtaining a physical location of a sensor on a device; determining that quality of data captured by the sensor physically located on the device is degraded based on a comparison of the captured data to a quality threshold; and, in response to determining that the quality of the data captured by the sensor is degraded, displaying a visual indicator on a display of the device. The visual indicator includes at least one non-textual component that directs a user to the physical location of the sensor on the device.

20 Claims, 3 Drawing Sheets

(56) References Cited

U.S. PATENT DOCUMENTS

| | | | |
|---|---|---|---|
| 11,044,567 B1* | 6/2021 | Li | G10L 25/51 |
| 11,240,329 B1* | 2/2022 | Jain | G16H 20/10 |
| 2009/0306931 A1 | 1/2009 | Shmuel | |
| 2009/0196429 A1* | 8/2009 | Ramakrishnan | H04R 29/004 |
| | | | 381/26 |
| 2014/0002238 A1* | 1/2014 | Taveau | G07C 9/257 |
| | | | 340/5.53 |
| 2014/2930791 | 10/2014 | Peyman | |
| 2015/0304786 A1* | 10/2015 | Partio | H04R 25/305 |
| | | | 381/58 |
| 2017/0144448 A1* | 5/2017 | Smith | B41J 2/175 |
| 2017/0156005 A1* | 6/2017 | Li | H04R 29/005 |
| 2019/0172464 A1* | 6/2019 | Bargetzi | G10L 15/22 |
| 2021/0192229 A1* | 6/2021 | Johnson | G08G 1/165 |

FOREIGN PATENT DOCUMENTS

| | | |
|---|---|---|
| CN | 104994535 B | 8/2019 |
| WO | 2018014449 A1 | 1/2018 |

OTHER PUBLICATIONS

Decrop et al., "Mitigation of Obstacles While Capturing Media Content," U.S. Appl. No. 17/203,047, filed Mar. 16, 2021.

Goode, "Touchless Gesture Controls on Phones? Think Bigger," Wired, Aug. 12, 2019, 6 pages. <https://www.wired.com/story/gesture-controls-phones-samsung-lg-google/>.

IBM, "Build smarter mobile services and applications using IBM Cloud," https://www.ibm.com/cloud/mobile, printed Mar. 29, 2021, 1 pg.

Yao et al., "Feedback control of transitional shear flows: Sensor selection for performance recovery," arXiv:2009.03469v1 [physics.flu-dyn], Sep. 8, 2020, 29 pages.

"Notification of Transmittal of the International Search Report and the Written Opinion of the International Searching Authority,or the Declaration", From the International Searching Authority, Applicant's or agent's file reference: PF220077PCT, International application No. PCT/CN2022/083367, International filing date: Mar. 28, 2022, dated Jun. 17, 2022, 9 pgs.

* cited by examiner

DYNAMIC INTERFACE INTERVENTION TO IMPROVE SENSOR PERFORMANCE

BACKGROUND

Users are increasingly able to capture video, pictures, and audio with their computing devices. For example, many personal devices (e.g. handheld and wearable devices) have microphones, cameras, and other sensors capable of capturing content. Additionally, laptop computers, desktop computers, tablets, etc. also are often equipped with such sensors capable of capturing content. Additionally, such electronic devices enable multiple forms of communication including audio phone calls and video conferencing. However, one or more of the sensors on a device may be inadvertently covered and/or blocked by obstacles while capturing content (e.g. audio and/or video data) which results in sub-optimal captured content.

SUMMARY

Aspects of the disclosure may include a computer-implemented method, computer program product, and system. One example of the method comprises obtaining a physical location of a sensor on a device; determining that quality of data captured by the sensor physically located on the device is degraded based on a comparison of the captured data to a quality threshold; and, in response to determining that the quality of the data captured by the sensor is degraded, displaying a visual indicator on a display of the device. The visual indicator includes at least one non-textual component that directs a user to the physical location of the sensor on the device.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
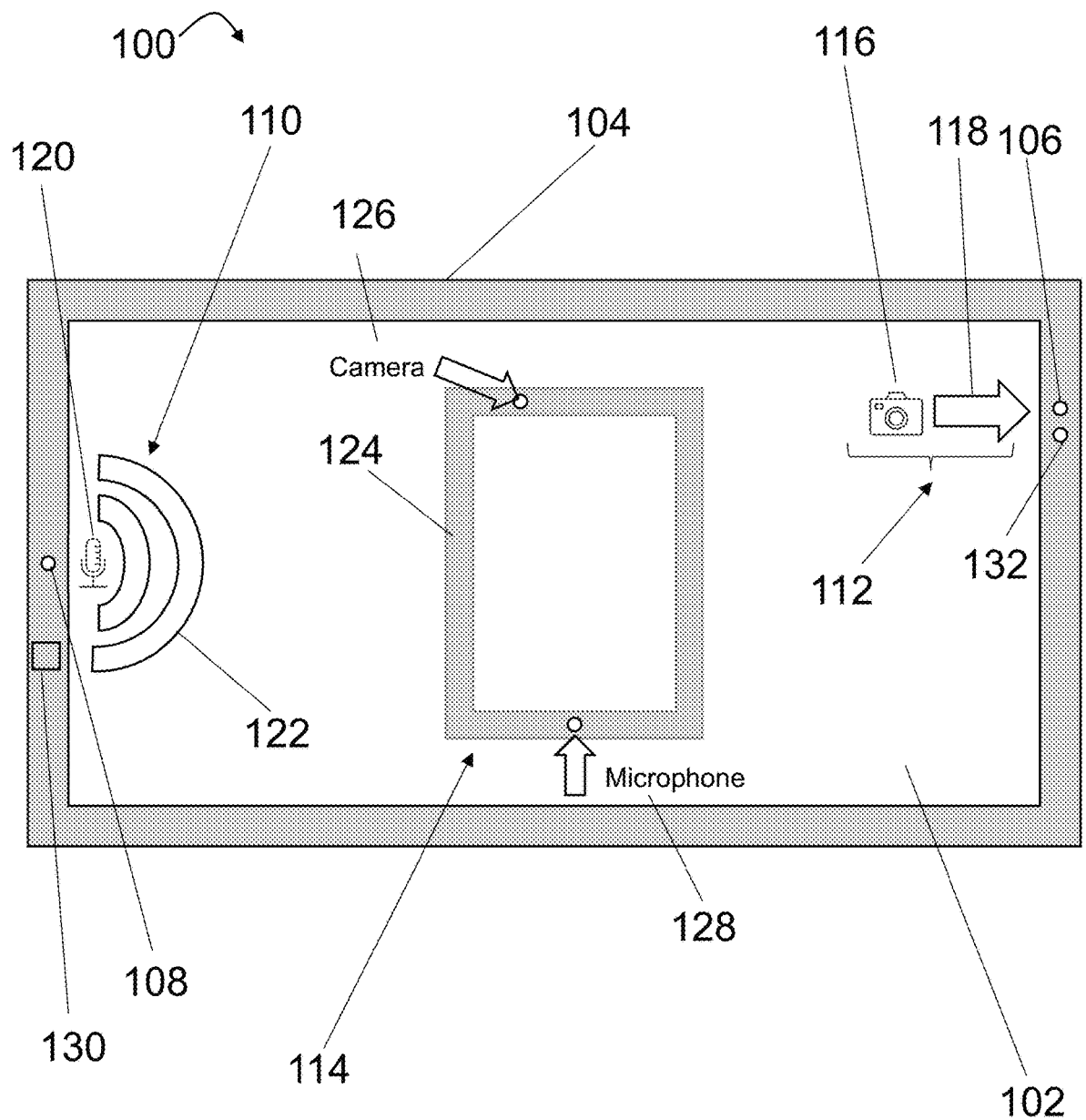
FIG. 1 is a block diagram of one embodiment of an example device.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material." Additionally, the terms "in communication" or "communicatively coupled" include the use of any electrical or optical connection, whether wireless or wired, that allows two or more systems, components, modules, devices, etc. to exchange data, signals, or other information using any protocol or format.

As discussed above, many computing devices have sensors such as cameras and microphones which enable a user to capture data such as media content (e.g. images, videos, audio), temperature data, light data, proximity data, pressure data, etc. using the portable device. Indeed, many such devices have multiple sensors including multiple sensors of the same type (e.g. multiple cameras and/or multiple microphones). However, such sensors can be blocked by obstacles. For example, one or more of the sensors can be blocked by the user of the device (e.g. a portion of the hand or article of clothing can cover a sensor either partially or fully). Additionally, a sensor can be blocked by other external factors. For example, dust can accumulate on a sensor, such as a microphone, which reduces the quality of the data captured. As used herein, the terms "blocked" and "obstructed" and variations thereof can be used interchangeably. In addition, as used herein, a sensor is considered blocked or obstructed when at least a portion of the sensor is covered or obstructed. As stated above, the sensor can be covered by an article of clothing, a user's finger, dust on the sensor, etc.

Additionally, a sensor can be obstructed by a physical object such as another person located in front of the sensor (e.g. a person standing in front of a camera which obstructs the view of a scene being captured by the camera). Such blockage or obstruction of sensors can reduce the quality of the captured media which can result in reduced user satisfaction. Additionally, the quality of the captured media can be reduced if the user is too far away from the sensor, such as a microphone during a video conference for example, or if the user is speaking in a direction away from the microphone. Such actions can also reduce the quality of the captured media. The embodiments described herein enable proactive communication with the user to facilitate mitigating such causes of reduction in the quality of captured data. As used herein, the term captured data refers to data obtained from one or more sensors on the device. Such data can be media data (e.g. audio, image, video), temperature data, light data, pressure data, proximity data, location data, and the like. The embodiments described below make particular reference to different types of media data for ease of explanation. However, it is to be understood that captured data can include data other than audio and visual data and that the embodiments described herein can be implemented to help facilitate correction of degraded quality of data captured by other types of sensors in addition to microphones and cameras.

FIG. 1 is a depiction of one embodiment of an example device 100. Although the device 100 is depicted as a tablet or smartphone, it is to be understood that the embodiments of the invention are not to be so limited. For example, in other embodiments, device 100 can be implemented as a desktop computer, a laptop computer, or a wearable device, etc. Device 100 includes a housing 104, a display 102, a camera 106, and a microphone 108. It is to be understood that although only a single camera 106 and a single microphone 108 are depicted in this example, it is to be understood that more than one camera and/or more than one microphone can be implemented in other embodiments. Similarly, in some embodiments, more than one display can be implemented, such as with a desktop computer having more than one attached display unit for example.

Furthermore, in embodiments in which device 100 has a plurality of sensors of the same type (e.g. a plurality of cameras or a plurality of microphones), each instance of the sensor can be different from other instances. For example, a mobile device can include two or more camera sensors, where the characteristics of each camera sensor are different. For example, a camera sensor can have a higher pixel density than another on the same device, be located on a different portion of the device (e.g. front-side or back-side), can have different focal lengths than another camera sensor, etc. Similarly, a device having a plurality of microphone sensors can have microphone sensors with different characteristics from one another.

Device 100 is configured to determine when the quality of data captured by a sensor falls below or is predicted to fall below a predetermined level. For example, the device 100 can determine that a sensor capturing images, video, and/or audio is being blocked and/or to predict when such blockage will occur. For example, in some embodiments, the device 100 can obtain data from one or more proximity sensors 132 to determine that a camera sensor and/or microphone sensor is blocked. Such proximity sensors 132 can be implemented as any appropriate type of proximity sensors, including, but not limited to capacitive, inductive, magnetic, and/or optical proximity sensors. Such proximity sensors 132 can be placed near a microphone or camera of the device 100 such that the proximity sensor 132 can detect that an object is in proximity to the microphone or camera and potentially blocking the respective microphone or camera. In addition, the device 100 can use the data from proximity sensors 132 to identify how far the physical object or obstacle is from the camera or microphone and if the object might block the camera or microphone.

Additionally, in some embodiments, the device 100 is configured to analyze image and audio data as it is being captured to identify a degradation in quality. For example, a degradation in the quality of the captured data can indicate a possible blockage of the corresponding sensor. Additionally, a degradation in quality of the audio can indicate that the speaker or source of the audio is too far away from the microphone 108 of device 100 for the microphone 108 to capture the audio with high quality or volume. Thus, in some embodiments, the device 100 is configured to detect a change in the quality of the data being recorded. For example, the device 100 can detect changes in the amplitude of audio data. Additionally, such degradation can be determined by comparing characteristics of the captured data to a baseline developed over time based on a plurality of prior data captured by the same sensor. In other words, if the sensor is blocked at the beginning of the data capture, the blockage can be detected by comparing the data to a baseline so that, even in the absence of a significant change in the data from the beginning of data capture, a blockage can be detected.

Furthermore, the baseline can be used to account for variations in use by different users. For example, a first user may speak relatively louder than a second user. Thus, different respective baselines can be computed for each of the first user and the second user. In some such embodiments, the device 100 is configured to identify which user is currently using the device 100. For example, the device 100 can perform voice recognition analysis, image analysis, fingerprint analysis, and/or unique passcodes associated with each user, etc. to identify which user is using the device 100. Thus, the device 100 can save different profiles for a plurality of users of the device 100, such profiles including, but not limited to, respective baselines used for detecting degradation of quality, historical data associated with the user, etc. Furthermore, in addition to or in lieu of using data collected from the device 100, a baseline can also be computed based on crowdsourced data obtained from other devices, in some embodiments.

In addition, historical data gathered from sensors, such as camera 106 and microphone 108 as well as other sensors, can be used to help predict when a blockage of the sensors will occur. For example, based on historical data, device 100 can determine a likelihood that a given user will obstruct a microphone when making a telephone call by analyzing patterns in the user's manner of holding the device and resulting obstructions of the microphone 108. In other words, the device 100 can predict that when the user is answering a call or making a phone call, that user typically holds the device 100 in a way that obstructs the microphone. Similar historical patterns can be identified for other sensors and activities, including but not limited to taking photographs, participating in video conferences, etc. Furthermore, device 100 can include, in some embodiments, other sensors to help identify patterns in the historical data. For example, device 100 can include one or more pressure sensors 130 that can provide data regarding grip patterns of the user which can be used to predict when a sensor will be obstructed.

Additionally, in some embodiments, the historical data can be further used to help identify potential causes of the degradation in quality of the sensor data. For example, if the historical data indicates that the quality of audio received via the microphone 108 has been degrading gradually over a period time, then this can be indication that lint or dust has built-up on the microphone 108. In contrast, if the degradation occurred suddenly, this can be indication that the microphone 108 has been covered by an object, such as an article of clothing or hand. Thus, by analyzing the historical data, the device 100 is able to determine the relative likelihood of different causes of the degradation of quality.

The device 100 is further configured to provide guidance to a user of the device 100 to alleviate the detected degradation in quality. In particular, the device 100 is configured to display one or more visual indicators such as indicators 110, 112, and 114. The visual indicators 110, 112, and 114 selected to help guide a user in alleviating a cause of the reduced or degraded data quality. For example, many devices have a plurality of components, such as multiple cameras, microphones, speakers, etc. The user may not know or be able to easily ascertain where each camera, microphone, etc. is or which of the plurality of sensors is the sensor that is receiving reduced quality data. Additionally, in some situations, the user may not be aware of the degraded quality. For example, when speaking in a video conference, the user may not be aware that video of the user is not being captured and sent to the other participants in the video conference. This could happen, for instance, if the user has not removed a sliding privacy shield covering a camera. Similarly, a user may not be aware that the audio being transmitted to other participants of the video conference or of a phone call has reduced quality (e.g. muffled, low volume, distorted, etc.). Thus, one or more of the visual indicators 110, 112, and 114 can be used to alert a user to a detection of degraded quality as well as to direct the user in alleviating the cause.

For example, the visual indicator 110 includes a plurality of concentric partial circles 122 and an icon 120. The concentric partial circles 122 are approximately centered on a location near the microphone 108 in this example. Similarly, the icon 120 is located near the physical location of the microphone 108. By locating the icon 120 and the circles 122 near the physical location of the microphone 108, the visual indicator 110 is able to guide a user to the location of the microphone 108. Furthermore, the icon 120 in this example depicts a generic microphone to indicate to the user that the visual indicator 110 is referencing a location of the microphone 108. As discussed above, the user may not know or be able to easily ascertain where a sensor is located or which sensor is being obstructed. Thus, by locating the indicator 110 near the physical location of the microphone 108, the user can easily locate the sensor which has been detected to be inputting degraded data. Additionally, although shown as a static visual depiction in FIG. 1, in some embodiments, the visual indicator 110 is not a static visual depiction. That is, the visual indicator 110 can be animated such as varying colors, intensity of color, or brightness in a pattern, such as a pulsing or wave pattern, to direct the user to the location of the microphone 108. It is to be understood that visual indicator 110 is provided by way of example only. In particular, in other embodiments, visual indicators do not include an icon 108 and/or concentric circles 122. In yet other embodiments, the visual indicators can also include other components in addition to or in lieu of icon 108 and/or concentric circles 122.

For example, visual indicator 112 includes an icon 116 and an arrow 118. Thus, visual indicator 112 does not include concentric circles 122. Rather, icon 116 and arrow 118 are located proximate to the physical location of a sensor (i.e. camera 106 in this example). Additionally, arrow 118 points to the location of the camera 106. Similar to visual indicator 110, visual indicator 112 can also be animated to vary colors, intensity, brightness, etc. to direct the user to the physical location of the sensor. Furthermore, implementations of a visual indicator need not be located on the display 102 proximate to the physical location of the corresponding sensor. For example, visual indicator 114 is a depiction of the device 100 which includes labels 126 and 128 to indicate the location of the respective sensors.

The visual indicators 110, 112, and/or 114 can be displayed on display 102 by overlaying the visual indicators 110, 112, 114 on top of other content displayed on the display 102, in some embodiments. In other embodiments, the content displayed on the display 102 is minimized such that a new screen or windows is opened to display one or more of the visual indicators 110, 112, or 114. In addition, more than one visual indicator can be displayed at the same time. For example, the indicator 114 depicting a diagram of the device 100 can be displayed simultaneously with visual indicator 110 and/or visual indicator 112. Furthermore, other information can be displayed together with one or more of the visual indicators. For example, a textual list of possible causes and/or possible steps to be taken by the user can be displayed on display 102 together with one or more of visual indicators that direct the user to the location of a given sensor or provide other visual guidance for the user. Such a textual list can be ordered based on a probability or likelihood of the cause of the degradation as determined by the device 100 based on historical data and data from other sensors, such as sensors 130 and/or 132, for example. In another example, textual information can confirm or direct a user to a location of a sensor. For example, if a given sensor is located on a different side of device 100 from the display 102, then textual information can convey this information to the user.

Additionally, other variations of visual indicators may provide other guidance for a user in addition to or in lieu of a location of a given sensor. For example, a picture of a hand indicating for the user to come closer can be displayed on the display 102 such that the user knows that the device 100 is too far away from the user and that the user needs to move closer to the device 100. Thus, the visual indicators 110, 112, and 114 depicted in FIG. 1 are provided by way of example only and that other visual indicators can be implemented in other embodiments to guide the user in alleviating a possible cause of detected degradation in the quality of media data captured by one or more sensors.

The information regarding the location of sensors on device 100 can be obtained in various ways. For example, in some embodiments, an application running on device 100 can collect identification information regarding model number, manufacturer, etc. from the device 100. In some embodiments, the application is able to communicate over a network to collect device information regarding the type of sensors, location of sensors, display size, display type, characteristics of sensors, etc. from the manufacturer or other repository based on the collected identification information (e.g. model number, serial number, etc.). In other embodiments, a database or repository of device information for a plurality of devices can be stored on the device 100 and the corresponding device information can be located based on the identification information collected by the application running on device 100. The device information, such as location and type of sensor, can be used to locate the visual indicators 110, 112, and/or 114 in the appropriate location on the display 102. Furthermore, while the functionality of the embodiments described herein can be implemented at the application level, in some embodiments, it is to be understood that, in other embodiments, the functionality of the embodiments described herein can be implemented at the operating system level or a combination of application and operating system levels.

It is to be understood that the components of device 100 depicted in FIG. 1 are provided by way of example only and that other implementations can include other components in addition to or in lieu of those shown in FIG. 1. For example, device 100 can include one or more haptic vibration motors which can provide haptic feedback to a user in addition to the visual indicators. For example, if a user is talking on a phone and not looking at the display 102, haptic vibration motors can be used to notify the user that they should look at the display 102. Additionally, device 100 can include one or more speakers, in some embodiments, which can provide audio instructions or guidance to the user in addition to the visual guidance provided on display 102.

Figure 2:
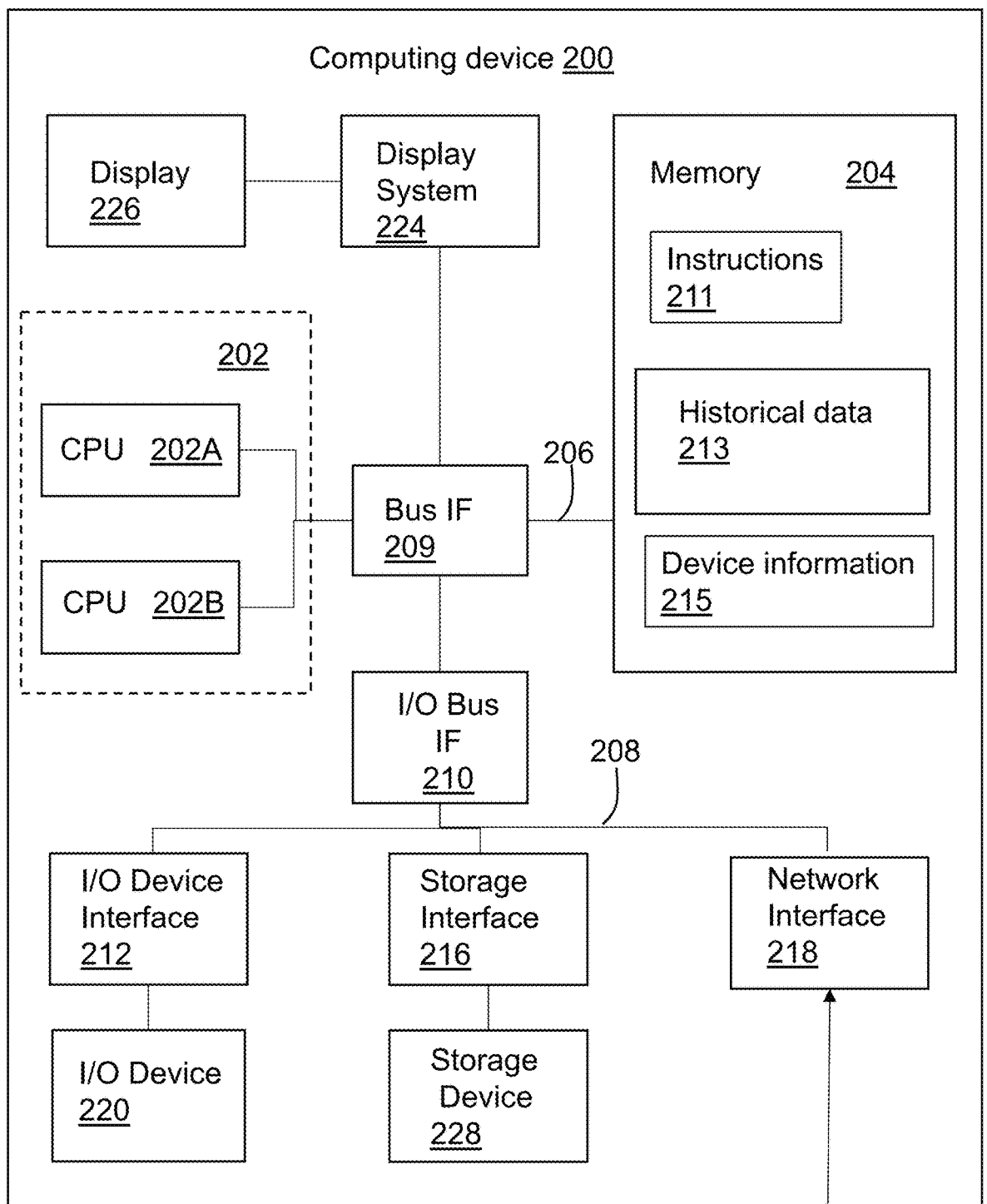
FIG. 2 is a block diagram of one embodiment of an example computing device.

FIG. 2 is a block diagram of one embodiment of an example computing device 200 configured to implement the functionality of device 100 discussed above. The components of the computing device 200 shown in FIG. 2 include one or more processors 202, a memory 204, a storage interface 216, an Input/Output ("I/O") device interface 212, and a network interface 218, all of which are communicatively coupled, directly or indirectly, for inter-component communication via a memory bus 206, an I/O bus 208, bus interface unit ("IF") 209, and an I/O bus interface unit 210.

In the embodiment shown in FIG. 2, the computing device 200 includes one or more general-purpose programmable central processing units (CPUs) 202A and 202B, herein generically referred to as the processor 202. In some embodiments, the computing device 200 contains multiple processors. However, in other embodiments, the computing device 200 is a single CPU system. Each processor 202 executes instructions stored in the memory 204. Additionally, although the embodiments are described with respect to central processing unit chips, it is to be understood that the embodiments described herein are also applicable to a computer system utilizing digital signal processors (DSP) and/or graphic processing unit (GPU) chips in addition to or in lieu of CPU chips. Hence, reference to a processor or processing unit herein can refer to CPU chips, GPU chips, and/or a DSP.

In some embodiments, the memory 204 includes a random-access semiconductor memory, storage device, or storage medium (either volatile or non-volatile) for storing or encoding data and programs. For example, the memory 204 stores instructions 211, historical data 213 and device information 215. When executed by a processor such as processor 202, the instructions 211 cause the processor 202 to perform the functions and calculations discussed herein with respect to detecting degradation in the quality of captured media data (e.g. images, video, audio) and providing visual indicators to guide a user in alleviating the source of the degradation, as discussed herein. Furthermore, although not depicted in FIG. 2, in some embodiments, the memory 204 further stores profile data for a plurality of users as discussed herein. The profile data can be used to personalize the detection of degradation as well as to provide personalized guidance in alleviating a cause of the detected degradation, as discussed herein.

In some embodiments, the memory 204 represents the entire virtual memory of the computing device 200 and may also include the virtual memory of other computer devices coupled to the computing device 200 via a network. In some embodiments, the memory 204 is a single monolithic entity, but in other embodiments, the memory 204 includes a hierarchy of caches and other memory devices. For example, the memory 204 can exist in multiple levels of caches, and these caches may be further divided by function, so that one cache holds instructions while another holds non-instruction data, which is used by the processor. The memory 204 may be further distributed and associated with different processing units or sets of processing units, as is known in any various so-called non-uniform memory access (NUMA) computer architectures, for example. Hence, although the instructions 211, historical data 213, and device information 215 are stored on the same memory 204 in the example shown in FIG. 2 for purposes of explanation, it is to be understood that other embodiments can be implemented differently. For example, the instructions 211, historical data 213, and/or device information 215 can be distributed across multiple physical media.

The computing device 200 in the embodiment shown in FIG. 2 also includes a bus interface unit 209 to handle communications among the processor 202, the memory 204, the display system 224, and the I/O bus interface unit 210. The I/O bus interface unit 210 is coupled with the I/O bus 208 for transferring data to and from the various I/O units. In particular, the I/O bus interface unit 210 can communicate with multiple I/O interface units 212, 216, and 218, which are also known as I/O processors (IOPs) or I/O adapters (IOAs), through the I/O bus 208. The display system 224 includes a display controller, a display memory, or both. The display controller can provide video, still images, audio, or a combination thereof to a display device 226. The display memory may be a dedicated memory for buffering video data. The display system 224 is coupled with the display device 226. In some embodiments, the display device 226 also includes one or more speakers for rendering audio. Alternatively, one or more speakers for rendering audio may be coupled with an I/O interface unit. In alternate embodiments, one or more functions provided by the display system 224 are on board an integrated circuit that also includes the processor 202. In addition, in some embodiments, one or more of the functions provided by the bus interface unit 209 is on board an integrated circuit that also includes the processor 202.

The I/O interface units support communication with a variety of storage and I/O devices. For example, the I/O device interface unit 212 supports the attachment of one or more user I/O devices 220, which may include user output devices and user input devices (such as a keyboard, mouse, keypad, touchpad, trackball, buttons, light pen, or other pointing devices). A user can manipulate the user input devices using a user interface, in order to provide input data and commands to the user I/O device 220. Additionally, a user can receive output data via the user output devices. For example, a user interface may be presented via the user I/O device 220, such as displayed on a display device or played via a speaker.

The storage interface 216 supports the attachment of one or more storage devices 228, such as a flash memory. The contents of the memory 204, or any portion thereof, may be stored to and retrieved from the storage device 228 as needed. The network interface 218 provides one or more communication paths from the computing device 200 to other digital devices and computer devices. For example, in some embodiments the computing device 200 can communicate with a server to request and receive device information via the network interface 218.

Although the computing device 200 shown in FIG. 2 illustrates a particular bus structure providing a direct communication path among the processors 202, the memory 204, the bus interface unit 209, the display system 224, and the I/O bus interface unit 210, in alternative embodiments the computing device 200 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 210 and the I/O bus 208 are shown as single respective units, the computing device 200, can include multiple I/O bus interface units 210 and/or multiple I/O buses 208 in other embodiments. While multiple I/O interface units are shown, which separate the I/O bus 208 from various communication paths running to the various I/O devices, in other embodiments, some or all of the I/O devices are connected directly to one or more system I/O buses.

As discussed above, in some embodiments, one or more of the components and data shown in FIG. 2 include instructions or statements that execute on the processor 202 or instructions or statements that are interpreted by instructions or statements that execute on the processor 202 to carry out the functions as described herein. In other embodiments, one or more of the components shown in FIG. 2 are implemented in hardware via semiconductor devices, chips, logical gates, circuits, circuit cards, and/or other physical hardware devices in lieu of, or in addition to, a processor-based system. In addition, in other embodiments, some of the components shown in FIG. 2 can be omitted and/or other components can be included.

Figure 3:
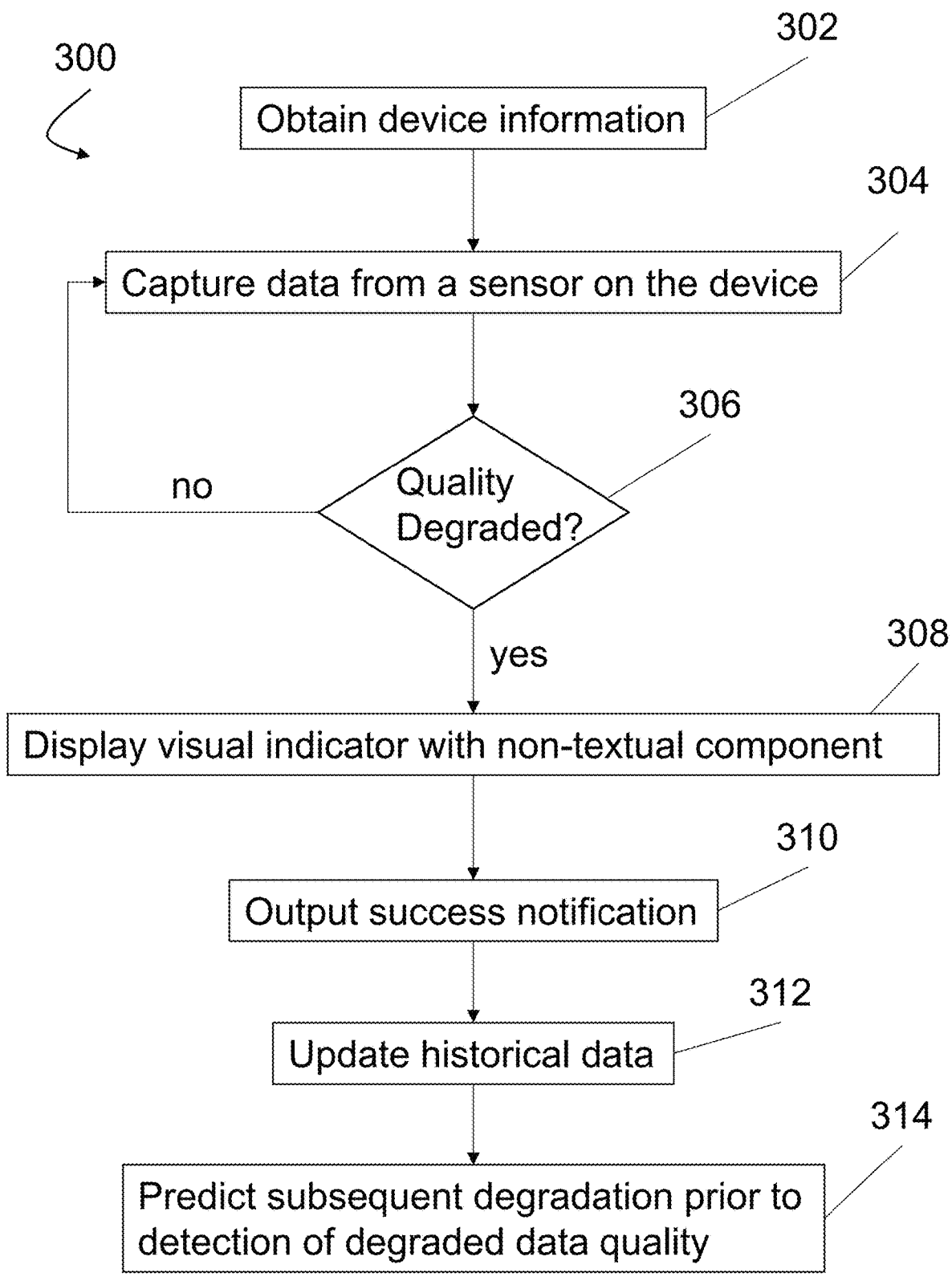
FIG. 3 is a flow chart depicting one embodiment of an example method of improving sensor performance.

FIG. 3 is a flow chart depicting one embodiment of an example method 300 of improving sensor performance. Method 300 can be implemented by a computing device, such as computing device 200 discussed above. It is to be understood that the order of actions in example method 300 is provided for purposes of explanation and that the method can be performed in a different order in other embodiments. Similarly, it is to be understood that some actions can be omitted or additional actions can be included in other embodiments. Furthermore, it is to be understood that a user can opt in to the data collection prior to the method 300 being executed on a device, such as device 100 or 200. For example, the user can be presented with a dialogue requesting a user to choose whether to authorize the collection and analysis of data or not.

At 302, device information is obtained. For example, as discussed above, a repository of device information can be searched based on identification information of the device, in some embodiments. The device information can include the types of sensors, characteristics of sensors, and/or physical location of one or more sensors on the device. Furthermore, the repository of device information can be stored locally on the device or accessed via a network, such as the internet. In addition, the identification information can be obtained, in some embodiments, by an application running on the device which obtains the identification information from the device, as discussed above.

At 304, data is captured by one of the sensors on the device. For example, a camera can capture video or images. Similarly, a microphone can capture audio data. Additionally, other sensors can be used to capture corresponding data, such as light sensors obtaining data on ambient light or pressure sensors obtaining data on pressure applied. At 306, it is determined if the quality of the captured data has degraded. For example, the captured data can be compared to a quality threshold to determine if the captured data is degraded. In some embodiments, a sensor profile can be developed for each sensor to be analyzed based on historical performance data of the sensor. For example, a profile for each camera, each microphone, etc. With respect to audio data from a microphone, for example, a mathematical approximation of the sound profile for a microphone can be developed, in some embodiments, using a Fourier series since audio quality tends to follow a sinusoidal wave format. With respect to a camera capturing image data, the image data can be evaluated from a pixel perspective, in some embodiments. For example, in some such embodiments, by identifying what certain pixels look like, a Convolutional Neural Network (CNN) image classifier can be implemented to identify a blockage or obstruction of the camera that reduces the quality of the obtained image data (e.g. still photo or video).

Convolutional Neural Networks are a class of deep feedforward artificial neural networks that have successfully been applied to analyzing visual imagery. Convolutional Neural Networks are made up of artificial or neuron-like structures that have learnable weights and biases. Each neuron receives some inputs and performs a dot product. A convolutional neural network architecture typically comprises a stack of layers operating to receive an input (e.g., a single vector) and transforms it through a series of hidden layers. Each hidden layer is made up of a set of neurons, where each neuron has learnable weights and biases, where each neuron can be fully connected to all neurons in the previous layer, and where neurons in a single layer can function independently without any shared connections. The last layer is the fully connected output layer and in classification settings it represents the class scores, which can be arbitrary real-valued numbers, or real-valued targets (e.g. in regression). However, it is to be understood that the embodiments described herein are not limited to Convolutional Neural Networks, but can be implemented using other types of neural networks, such as recurrent neural networks (RNN), Deep Convolutional Inverse Graphics Network (DCIGN), etc., to analyze images and videos.

In addition, determining a quality threshold for data obtained for the sensor can be based, at least in part, on a respective user profile for each of one or more users, as discussed above. For example, each respective user profile can be based on respective historical device usage data for the users. The historical device usage data can include, but is not limited to, such items as a manner of holding the device, time of day, actions being taken, application being used, volume of the user's voice, etc. Thus, in some embodiments, the quality threshold can be adapted to account for differences in the way each user interacts with the device to determine what is considered abnormal or degraded performance for the sensor.

If it is determined that the data quality is not degraded at 306, method 300 returns to 304 where subsequent data is captured at 304. If it is determined that the data quality is degraded at 306, method 300 proceeds to 308 where a visual indicator is displayed on a display of the device. The visual indicator includes a non-textual component that guides a user in alleviating a potential cause of the degraded quality of the data captured by the sensor. For example, the non-textual component directs the user to the physical location of the sensor on the device, in some embodiments. Additionally, the non-textual component can direct the user in actions to take, such as moving closer to the sensor.

In some embodiments, the visual indicator is displayed at a location on the display that is proximate to the physical location of the sensor. For example, as discussed above, in some embodiments, the non-textual component can include an icon displayed near the physical location of the sensor, concentric partial circles centered near the physical location of the sensor, an arrow displayed near and pointing towards a physical location of the sensor, etc. Additionally, in some embodiments, the non-textual component of the visual indicator can include a diagram of the device displayed on the device's display. The diagram can illustrate the physical location of the sensor, such as by highlighting the location of the sensor on the device, including labels indicating a location of the sensor on the device, etc. Furthermore, the visual indicator can be overlayed on top of content already displayed on the display, similar to a pop-up message, in some embodiments. In other embodiments, the content displayed on the device is replaced by the visual indicator. In addition, as discussed above, the visual indicator can also include textual components, such as labels, and a list of one or more potential causes of the degraded data. In some such embodiments, the list can order the potential causes in order of likelihood that the given potential cause is the actual cause of the degraded performance.

At 310, a success notification can be optionally output or provided to the user. The notification can be a visual notification, audible notification, and/or haptic feedback. The success notification is configured to provide feedback to the user that the quality of the degraded data has been improved such that comparison with the quality threshold indicates that the data is no longer determined to be degraded. For example, the device can detect and monitor use actions taken after receiving notice of the degraded data. In addition, the device can continue to monitor the quality of the data received from the sensor. Thus, in response to detecting user action and determining that data captured by the sensor subsequent to the user action has improved quality, the device can output the success notification.

At 312, the historical data can be updated based on the information regarding the degraded data, any user actions taken to alleviate the degraded data, device usage data at the time the degraded data was detected, etc. This feedback can be used to further improve the ability of the device to detect degraded data, such as being used to update the quality threshold. In addition, in some embodiments, the device is configured (e.g. a processor on the device executing instructions) to predict when the quality of the data captured by a sensor is likely to be degraded at 314. For example, if a given user is detected as using the device to make a phone call, the device can use the historical data to predict how the user will handle and/or use the device based on historical data to determine if the user is likely to obstruct the microphone, speak too softly, etc. Thus, in some such embodiments, the device can analyze historical device usage data to identify a pattern indicating a likelihood of obstruction of the sensor and compare current device usage data to the identified pattern. In response to determining that the current device usage matches the identified pattern, the device can provide a notification together with displaying the visual indicator prior to detecting degradation in the quality of data captured by the sensor. Thus, the device can provide proactive warnings to reduce the likelihood that the sensor will be blocked or otherwise captured degraded quality data. The notification can be visual, audible, or haptic feedback.

The device can be configured, in some embodiments, to use machine learning techniques to leverage space-time coordinates (i.e. $x, y, z, t \in \mathbb{R}^3$, T) to create paths in the historical data that represent circumstances or states in which the quality of data collected by a sensor will be degraded. If a current predicted path is similar to a previous path in the historical data in which degraded data quality was detected, then the device can predict a future degradation in the quality of data captured by a sensor (e.g. camera or microphone). For example, let p1, p2, . . . pn represent a set of paths in the historical data where degraded data quality was detected. Each path, pn, is well-defined by points in the space-time coordinates. Let ki be a list of paths describing a user's current use of the mobile device. Each path ki is defined by points in the space-time coordinates. If a difference in the current paths ki from historical paths pn is less than a predetermined threshold difference, ε, then the device can predict a future degradation in the quality of data captured by a sensor (e.g. a camera or microphone). For example, if $|ki-p1|<\varepsilon$, $|ki-p2|<\varepsilon$, . . . , $|ki-pn|<\varepsilon$ for a defined number of n, then the device predicts a future degradation of quality in the captured data.

Thus, the embodiments described herein, enable the detection of abnormal or degraded performance of a sensor and provide visual guidance to a user to locate the sensor on the device and to correct the potential causes of the abnormal performance. Furthermore, the embodiments described herein are able to proactively predict when degraded performance will occur along with the potential causes to provide a warning or notification to a user to help the user prevent the quality of the data being collected from being degraded.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
   obtaining, by a device, a physical location of a sensor on the device;
   determining a quality threshold based at least in part on historical device usage data associated with a device-user, the historical device usage data indicating a pattern of obstruction of the sensor by the device-user;
   determining, by the device, that quality of data captured by the sensor physically located on the device is degraded based on a comparison of the captured data to the quality threshold; and
   in response to determining that the quality of the data captured by the sensor is degraded, displaying a visual indicator on a display of the device, wherein the visual indicator includes at least one non-textual component that directs the device-user to the physical location of the sensor on the device.

2. The method of claim 1, wherein the quality threshold is further based, at least in part, on a sensor profile for the sensor developed based on historical performance data for the sensor.

3. The method of claim 1, wherein the historical device usage data for the device-user is obtained from a respective user profile for one or more device-users, where each respective user profile is based on respective historical device usage data for one of the one or more device-users.

4. The method of claim 1, further comprising:
   comparing current device usage data to the pattern of obstruction of the sensor by the device-user; and
   in response to determining that the current device usage data matches the pattern of obstruction of the sensor by the device-user, providing a notification together with displaying the visual indicator prior to detecting degradation in the quality of data captured by the sensor.

5. The method of claim 1, wherein the visual indicator is displayed on the display of the device at a location proximate to the physical location of the sensor.

6. The method of claim 5, wherein the non-textual component of the visual indicator includes a plurality of concentric partial circles centered near the physical location of the sensor.

7. The method of claim 1, wherein the non-textual component is animated to direct the user to the physical location of the sensor.

8. The method of claim 1, wherein the non-textual component of the visual indicator includes a diagram of the device displayed on the display, the diagram illustrating the physical location of the sensor.

9. The method of claim 1, further comprising providing a success notification to the user in response to detecting user action and determining that data captured by the sensor subsequent to the user action has improved quality.

10. A computing device comprising:
a display;
a sensor configured to capture data; and
a processor communicatively coupled to the sensor and to the display, wherein the processor is configured to:
identify a physical location of the sensor on the computing device;
determine that quality of data captured by the sensor is degraded based on a comparison of the captured data to a quality threshold, wherein the quality threshold is based at least in part on historical device usage data associated with a device-user, the historical device usage data indicating a pattern of obstruction of the sensor by the device-user; and
in response to determining that the quality of the data captured by the sensor is degraded, displaying a visual indicator on the display, wherein the visual indicator includes at least one non-textual component configured to guide the device-user in alleviating a potential cause of the degraded quality of the data captured by the sensor.

11. The computing device of claim 10, wherein the processor is configured to:
develop a sensor profile for the sensor based on historical performance data for the sensor; and
determine the quality threshold in part on the sensor profile.

12. The computing device of claim 10, wherein the historical device usage data for the device-user is obtained from a respective user profile for one or more device-users, where each respective user profile is based on respective historical device usage data for one of the one or more device-users.

13. The computing device of claim 10, wherein the visual indicator is displayed on the display of the computing device at a location proximate to the physical location of the sensor.

14. The computing device of claim 10, wherein the at least one non-textual component of the visual indicator includes a diagram of the computing device displayed on the display, the diagram illustrating the physical location of the sensor.

15. The computing device of claim 10, wherein the at least one non-textual component of the visual indicator is animated to direct the user to the physical location of the sensor.

16. A computer program product comprising a computer readable storage medium having a computer readable program stored therein, wherein the computer readable program, when executed by a processor, causes the processor to:
identify a physical location of a sensor on a computing device;
determine a quality threshold based at least in part on historical device usage data associated with a device-user, the historical device usage data indicating a pattern of obstruction of the sensor by the device-user;
determine that quality of data captured by the sensor is degraded based on a comparison of the captured data to the quality threshold; and
in response to determining that the quality of the data captured by the sensor is degraded, displaying a visual indicator on a display, wherein the visual indicator includes at least one non-textual component that directs the device-user to the physical location of the sensor on the computing device.

17. The computer program product of claim 16, wherein the computer readable program is further configured to cause the processor to:
develop a sensor profile for the sensor based on historical performance data for the sensor; and
determine the quality threshold in part on the sensor profile.

18. The computer program product of claim 16, wherein the historical device usage data for the device-user is obtained from a respective user profile for one or more device-users, where each respective user profile is based on respective historical device usage data for one of the one or more device-users.

19. The computer program product of claim 16, wherein the visual indicator is displayed on the display of the computing device at a location proximate to the physical location of the sensor.

20. The computer program product of claim 16, wherein the non-textual component of the visual indicator includes a diagram of the computing device displayed on the display, the diagram illustrating the physical location of the sensor.

* * * * *